No. 790,222. PATENTED MAY 16, 1905.
H. J. McMURRAY.
ROLLER GUIDE FOR DRIVE BELTS.
APPLICATION FILED MAR. 26, 1904.

Attest:
R. C. Orwig.
L. H. Orwig.

Inventor
Herman J. McMurray.
by J. C. Sweet Atty.

No. 790,222. Patented May 16, 1905.

UNITED STATES PATENT OFFICE.

HERMAN J. McMURRAY, OF NEWTON, IOWA, ASSIGNOR TO L. A. GATES, OF NEWTON, IOWA.

ROLLER-GUIDE FOR DRIVE-BELTS.

SPECIFICATION forming part of Letters Patent No. 790,222, dated May 16, 1905.

Application filed March 26, 1904. Serial No. 200,140.

*To all whom it may concern:*

Be it known that I, HERMAN J. MCMURRAY, a citizen of the United States of America, and a resident of Newton, Jasper county, Iowa, have invented a new and useful Roller-Guide for Drive-Belts, of which the following is a specification.

The object of this invention is to provide improved means for guiding drive-belts and preventing sidelashing thereof between the pulleys.

My invention consists in the construction, arrangement, and combination of elements hereinafter set forth, pointed out in my claims, and illustrated by the accompanying drawings, in which—

Figure 1:
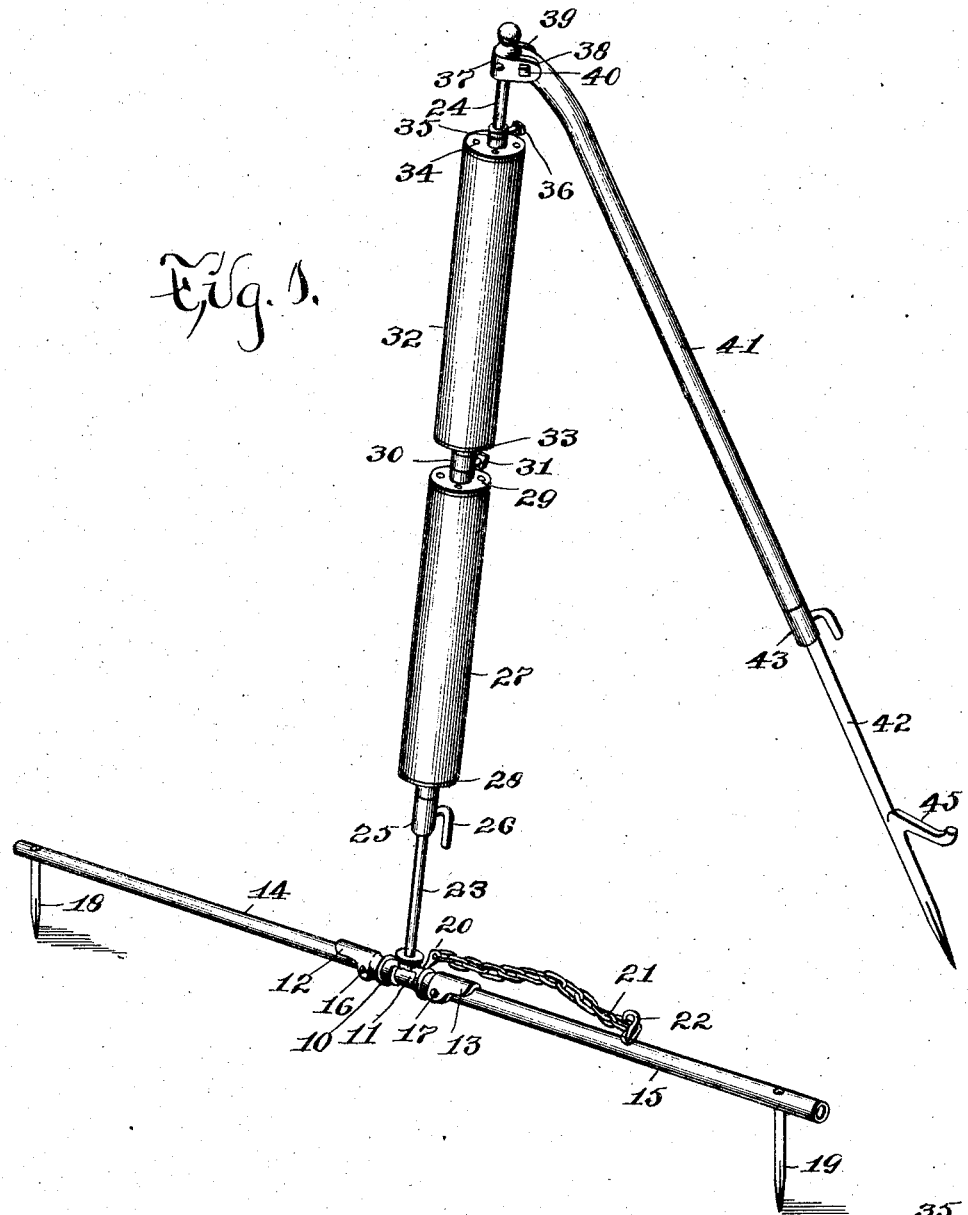
Figure 2:
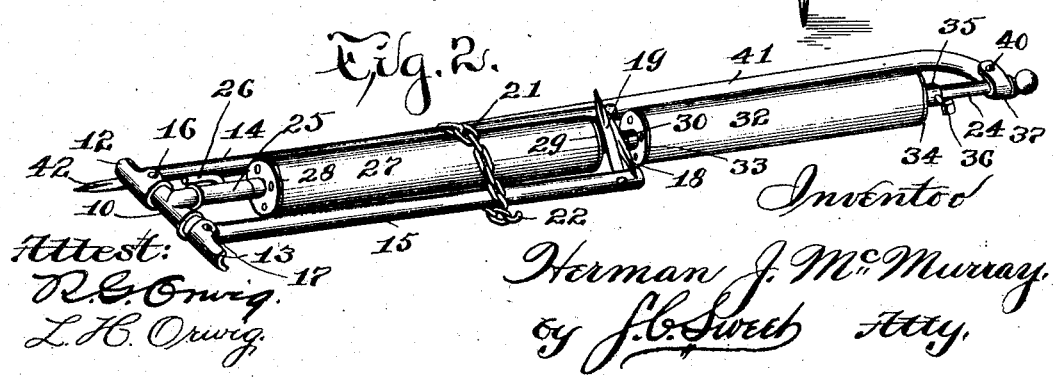

Figure 1 is a perspective of the complete device in position for practical use. Fig. 2 is a perspective of the complete device folded for transportation or storage.

In the construction of the device as shown the numeral 10 designates a T, in which is mounted loosely a short shaft 11. Sockets 12 13 are mounted on and fixed to the end portions of the shaft 11 and at their inner ends abut the ends of the T 10. The outer end portions of the sockets 12 13 are notched radially, and tubular base-bars 14 15 are mounted therein and hinged thereto by bolts 16 17. The base-bars 14 15 may be moved or swung laterally on the pivots formed by the bolts 16 17 in one direction only, and such flexure or folding movement is provided solely to permit compact assembling of the parts for transportation and storage, as shown in Fig. 2. Normally in use the base-bars 14 15 project in alinement with each other in opposite directions from the T 10. Spikes 18 19 are fixed to and project laterally from the outer end portions of the base-bars 14 15 at right angles to the pivot-bolts 16 17 and are adapted to engage the soil or other supporting-surface and maintain the machine in a desired position in which it is placed manually. A pin 20 is mounted at times in coinciding apertures in the T 10 and shaft 11 to lock said T and shaft together, and said pin is connected by a chain 21 to a hook 22 on the base-bar 15. A stem 23 is provided and its lower end portion is inserted and fixed in the lateral arm of the T 10. A tubular stem, standard, or sleeve 24 is mounted on and telescopically of the stem 23, and a collar 25, fixed to the lower end portion of said sleeve, is provided with a handle-screw 26, extending through the sleeve and engaging the stem. A roller 27, preferably of wood and tubular, is provided with hubs 28 29 on its end portions, which hubs are journaled on the sleeve 24, thereby mounting said roller for revolution on said sleeve. A collar 30 is mounted on the sleeve 24, abutting the hub 29, and is secured to said sleeve by a set-screw 31. A roller 32, preferably of wood and tubular, is provided with hubs 33 34 on its ends journaled on the sleeve 24, the hub 33 abutting the collar 30, thereby mounting the roller for revolution on the sleeve. A collar 35 is mounted on the sleeve 24, abutting the hub 34, and is secured to said sleeve by a set-screw 36. A cap 37 is mounted rigidly on the upper end portion of the sleeve 24 and is formed with ears 38 39, projecting laterally therefrom in parallel planes, and a bolt 40 is mounted through apertures in said ears, said bolt preferably in a plane parallel with the shaft 11. A telescoping brace or leg is provided and is formed of a sleeve 41, curved slightly at its upper end and pivoted or hinged on the bolt 40, and a stake 42, mounted for longitudinal adjustment in said sleeve. The sleeve 41 is provided with a collar 43, rigidly mounted on its lower end, and a handle-screw 44 is mounted in said collar and extends through the sleeve and engages the stake 42, whereby the stake and sleeve are rigidly connected at any desired length of adjustment. A step 45 is formed on and extends laterally from the lower end portion of the stake 42 and serves the dual purpose of receiving foot-pressure to set the stake in the soil and as a stop to prevent too great penetration of the stake in yielding soil.

It will be observed that the pivotal support of the rollers may be varied in length by adjusting the telescoping of the stem 23 in the sleeve 24, and in like manner the altitude of the rollers may be varied and adjusted.

It will be observed that the inclination of the rollers from the perpendicular may be governed and controlled by angular adjustment or longitudinal adjustment of the telescoping brace or leg. It also will be observed that the rollers 27 and 32 have freedom of movement on the sleeve 24 and may be adjusted longitudinally of said sleeve, if so desired.

By reference to Fig. 2 it will be observed that the pin 20 may be removed from the T and shaft, the shaft be rotated one-half of one revolution in the T, the base-bars 14 15 be folded upward with the spikes 18 19 parallel with each other between the rollers, the stake may be shortened in the sleeve 41, and the chain 21 may be passed around the entire device and attached again to the hook 22, thus compactly folding and securing the various parts of the device for transportation and storage.

In use the machine is positioned in the lee of the belt 46, and edges of said belt engage the rollers 27 32, respectively, and are held thereby in true-running planes without sidelashing that otherwise might occur on account of wind-pressure laterally of the belt.

I claim as my invention—

1. A guide for belts, comprising the base, a stem on the base, a sleeve on and adjustable longitudinally of said stem, rollers on said sleeve and arranged in longitudinal alinement with each other, and a brace-leg hinged to said sleeve.

2. A guide for belts, comprising a foldable base, a stem on said base, a sleeve on said stem, rollers on said sleeve, and a brace-leg hinged to said sleeve.

3. A guide for belts, comprising a base, a telescoping standard on said base, rollers end to end on said standard, and a brace-leg hinged to said standard.

4. A guide for belts, comprising a T, a shaft in said T, a pin detachably connecting said shaft and T, sockets on said shaft, base-bars hinged to said sockets, spikes on said base-bars, a standard on said T, rollers on said standard, and a brace-leg hinged to said standard.

5. A guide for belts, comprising a T, a shaft in said T, a pin detachably connecting said shaft and T, sockets on said shaft, base-bars hinged to said sockets and adapted to swing in one direction only therefrom, a standard on said T, rollers on said standard end to end, and a telescoping brace-leg hinged to said standard.

6. A guide for belts, comprising a base, a stem on said base, a sleeve on said stem, means for locking said sleeve and stem together, a roller on said sleeve, a collar on said sleeve abutting said roller, another roller on said sleeve abutting said collar, another collar on said sleeve abutting said latter roller, a cap on the sleeve, and a telescoping brace-leg hinged to said cap.

7. A guide for belts, comprising a base, a stem on the base, a sleeve on said stem, rollers mounted in longitudinal alinement on said sleeve, a brace-leg formed of a second sleeve hinged to the first sleeve and a stake therein, means for locking the stake and second sleeve together, and a step on said stake.

Signed by me at Des Moines, Iowa, this 11th day of February, 1904.

HERMAN J. McMURRAY.

Witnesses:
  HENRY H. GRIFFITHS,
  S. C. SWEET.